(12) United States Patent
Farré Guiu et al.

(10) Patent No.: US 10,489,722 B2
(45) Date of Patent: Nov. 26, 2019

(54) SEMIAUTOMATIC MACHINE LEARNING MODEL IMPROVEMENT AND BENCHMARKING

(71) Applicant: Disney Enterprises, Inc., Burbank, CA (US)

(72) Inventors: Miquel Angel Farré Guiu, Bern (CH); Marc Junyent Martin, Barcelona (ES); Matthew C. Petrillo, Sandy Hook, CT (US); Monica Alfaro Vendrell, Barcelona (ES); Pablo Beltran Sanchidrian, Barcelona (ES); Avner Swerdlow, Los Angeles, CA (US); Katharine S. Ettinger, Santa Monica, CA (US); Evan A. Binder, Calabasas, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 196 days.

(21) Appl. No.: 15/661,084

(22) Filed: Jul. 27, 2017

(65) Prior Publication Data

US 2019/0034822 A1 Jan. 31, 2019

(51) Int. Cl.
*G06K 9/62* (2006.01)
*G06N 20/00* (2019.01)
(Continued)

(52) U.S. Cl.
CPC ......... *G06N 20/00* (2019.01); *G06K 9/00718* (2013.01); *G06K 9/6256* (2013.01);
(Continued)

(58) Field of Classification Search
CPC .......... G06N 20/00; G06N 5/022; G06N 5/04; G06K 9/6263; G06K 9/00718; G06K 9/6259
See application file for complete search history.

(56) References Cited

U.S. PATENT DOCUMENTS 8,626,682 B2 * 1/2014 Malik .................. G06K 9/6259
706/12
8,990,128 B2 * 3/2015 He .......................... G06K 9/628
706/12

(Continued)

OTHER PUBLICATIONS

Justin Talbot et al. "EnsembleMatrix: Interactive Visualization to Support Machine Learning with multiple classifiers" CHI 2009, Apr. 4-9, 2009, Boston, MA, USA.*

*Primary Examiner* — Samir A Ahmed
(74) *Attorney, Agent, or Firm* — Patterson + Sheridan, LLP

(57) ABSTRACT

Systems, methods, and articles of manufacture to perform an operation comprising processing, by a machine learning (ML) algorithm and a ML model, a plurality of images in a first dataset, wherein the ML model was generated based on a plurality of images in a training dataset, receiving user input reviewing a respective set of tags applied to each image in the first data set as a result of the processing, identifying, based on a first confusion matrix generated based on the user input and the sets of tags applied to the images in the first data set, a first labeling error in the training dataset, determining a type of the first labeling error based on a second confusion matrix, and modifying the training dataset based on the determined type of the first labeling error.

20 Claims, 9 Drawing Sheets

(51) Int. Cl.
   *G06N 5/02*      (2006.01)
   *G06K 9/00*      (2006.01)
   *G06N 5/04*      (2006.01)

(52) U.S. Cl.
   CPC ......... *G06K 9/6259* (2013.01); *G06K 9/6262* (2013.01); *G06K 9/6263* (2013.01); *G06N 5/022* (2013.01); *G06N 5/04* (2013.01)

(56) References Cited

U.S. PATENT DOCUMENTS

| | | | | |
|---|---|---|---|---|
| 8,996,452 | B2* | 3/2015 | Danciu | G06Q 10/06 707/603 |
| 2008/0312906 | A1* | 12/2008 | Balchandran | G06F 16/35 704/9 |
| 2012/0215727 | A1* | 8/2012 | Malik | G06K 9/6259 706/12 |
| 2012/0278275 | A1* | 11/2012 | Danciu | G06Q 10/06 706/59 |
| 2013/0325756 | A1* | 12/2013 | He | G06K 9/628 706/12 |
| 2017/0323212 | A1* | 11/2017 | Volkov | G06N 3/006 |

\* cited by examiner

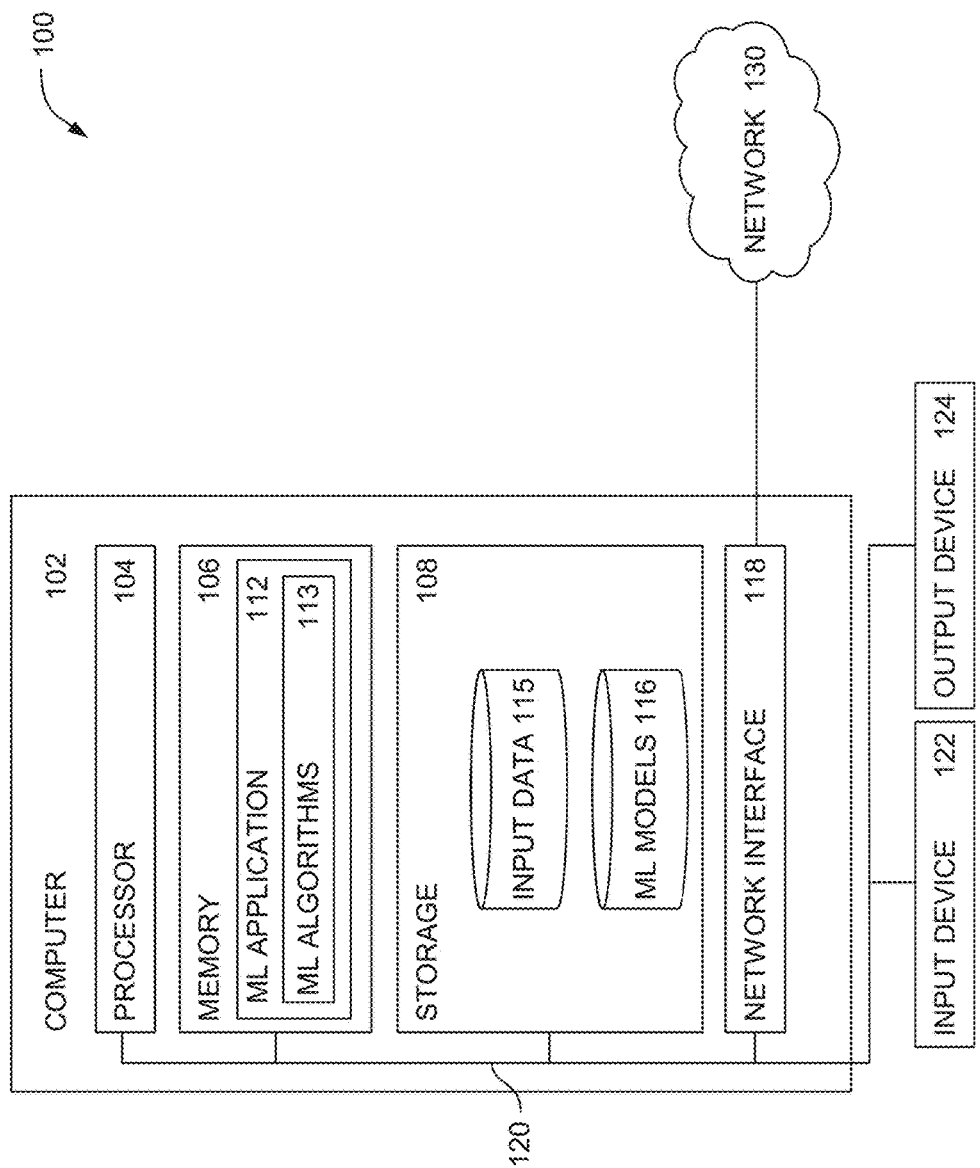

SEMIAUTOMATIC MACHINE LEARNING MODEL IMPROVEMENT AND BENCHMARKING

BACKGROUND

Field of the Invention

Embodiments disclosed herein relate to machine learning. More specifically, embodiments disclosed herein relate to semiautomatic machine learning model improvement and benchmarking.

Description of the Related Art

Many vendors offer machine learning (ML) algorithms to identify different types of elements in media files at high levels of accuracy. However, to provide high levels of accuracy, the algorithms must be trained based on a training dataset. Nevertheless, preparing an accurate training dataset to train the ML algorithms is difficult due to the need of keeping the dataset updated (e.g., cleaning the dataset, correcting errors in the dataset, adding more data, and the like). Furthermore, updating the dataset does not provide a description of the improvement or saturation of the ML algorithms after adding new edge cases.

SUMMARY

In one embodiment, a method comprises processing, by a machine learning (ML) algorithm and a ML model, a plurality of images in a first dataset, wherein the ML model was generated based on a plurality of images in a training dataset, receiving user input reviewing a respective set of tags applied to each image in the first data set as a result of the processing, identifying, based on a first confusion matrix generated based on the user input and the sets of tags applied to the images in the first data set, a first labeling error in the training dataset, determining a type of the first labeling error based on a second confusion matrix, and modifying the training dataset based on the determined type of the first labeling error.

In another embodiment, a computer program product comprises a computer-readable storage medium having computer-readable program code embodied therewith, the computer-readable program code executable by a processor to perform an operation comprising processing, by a machine learning (ML) algorithm and a ML model, a plurality of images in a first dataset, wherein the ML model was generated based on a plurality of images in a training dataset, receiving user input reviewing a respective set of tags applied to each image in the first data set as a result of the processing, identifying, based on a first confusion matrix generated based on the user input and the sets of tags applied to the images in the first data set, a first labeling error in the training dataset, determining a type of the first labeling error based on a second confusion matrix, and modifying the training dataset based on the determined type of the first labeling error.

In another embodiment, a system comprises one or more processors and a memory containing a program which when executed by the processors performs an operation comprising processing, by a machine learning (ML) algorithm and a ML model, a plurality of images in a first dataset, wherein the ML model was generated based on a plurality of images in a training dataset, receiving user input reviewing a respective set of tags applied to each image in the first data set as a result of the processing, identifying, based on a first confusion matrix generated based on the user input and the sets of tags applied to the images in the first data set, a first labeling error in the training dataset, determining a type of the first labeling error based on a second confusion matrix, and modifying the training dataset based on the determined type of the first labeling error.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 1 illustrates a system which provides semiautomatic machine learning model improvement and benchmarking, according to one embodiment.

DETAILED DESCRIPTION

Figure 2A:
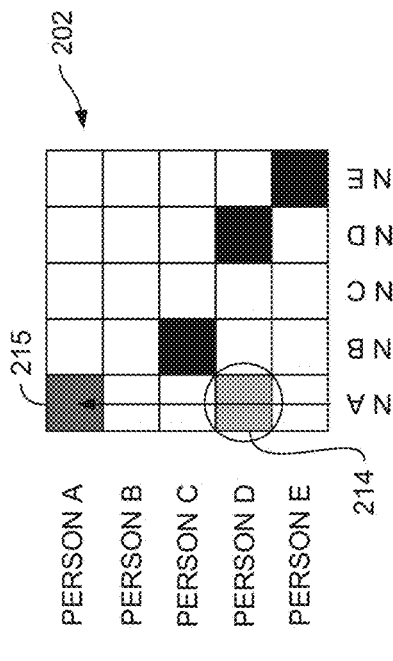
FIGS. 2A-2C illustrate example techniques to provide semiautomatic machine learning model improvement and benchmarking, according to various embodiments.

Embodiments disclosed herein provide techniques to improve unsupervised datasets that are used to create machine learning (ML) models. Generally, embodiments disclosed herein leverage a ML model built using an unsupervised training dataset to identify objects (e.g., people, locations, etc.) in media files, such as images and/or frames of video. One or more users are then presented a subset of the media files in the training data set to identify objects therein. Embodiments disclosed herein then leverage confusion matrices to improve the dataset and the ML model by adding, deleting, and/or curating categories of objects. Furthermore, embodiments disclosed herein provide feedback to the users regarding their performance in identifying objects. Further still, embodiments disclosed herein benchmark the ML model being trained to understand the improvements of the ML algorithm and identify when the ML algorithm has reached its limits (and therefore should be complimented with other algorithms).

FIG. 1 illustrates a system 100 which provides semiautomatic machine learning model improvement and benchmarking, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 contains the ML application 112, which is an application generally configured to improve the datasets (e.g., the input data 115) used to create machine learning models in the ML models 116, and improve the ML models 116 based on the improved datasets. As shown, the ML application 112 includes one or more machine learning algorithms 113 that generate the ML models 116 based on the input data 115. The input data 115 may include sets of images, videos, and the like. The images and/or videos may be clustered into different groups. However, in at least one embodiment, a given set of input data 115 does not include verified group labels (or metadata). For example, if a set of input data 115 includes a plurality of frames of video from a first movie, the frames of the video may not include labels indicating which people (if any) are depicted in a given frame of video. As another example, the frames of the video may include labels that are less reliable or labels that are not reliable. Furthermore, the set of input data 115 used for training may be "noisy", in that one or more labels, if present, are incorrect. For example, two images depicting a respective one of two different people may be tagged with the same label (e.g., an indication that the same person is depicted in each image). As another example, a frame of video depicting person X may be incorrectly tagged with a label indicating that person Y is depicted in the frame of video.

Continuing with the example of person recognition, the ML algorithms 113, when provided a set of training data 115, identify patterns and/or features in the set of training data 115 to create a ML model 116 used by the ML algorithms 113 to improve subsequent recognition of people in other images. However, the generated ML model 116 reflects labeling errors in the training input data 115. Therefore, when presented with a new set of input data 115 (e.g., frames of a second movie), the ML algorithms 113 may tag the frames of the second video with incorrect labels based on the ML model 116 built using the input data 115 of the first movie. To improve the initial set of input data 115 and/or the ML models 116, the ML application 112 may present one or more users with the set of input data 115 from the second movie and the corresponding labels generated using the ML model 116. The users may then review the video frames and corresponding labels generated for the second movie. The review process performed by each user may include one or more of accepting correct labels, rejecting incorrect labels, fixing incorrect labels, and adding new labels. In at least one embodiment, indications of the results of the user review process are then stored as metadata in the input data 115.

The ML application 112 may then generate confusion matrices to identify labeling errors in the initial set of input data 115 (e.g., the first movie) based on the labels generated for the input data 115 of the second movie. Generally, a confusion matrix is a table used to describe the classification performance of the ML models 116. FIG. 2A depicts a row-normalized confusion matrix 201. As shown, each row and column of the confusion matrix 201 corresponds to one of five example persons A-E. The y-axis of the confusion matrix 201 corresponds to the classification results generated by human users, while the x-axis of the confusion matrix 201 corresponds to the classification results generated by the ML algorithms 113 using the ML models 116. The confusion matrix 201 includes underlying data (not pictured) reflecting the images and/or video frames for which a tag for a given person A-E was applied by the humans and ML algorithms 113 using the ML models 116. The underlying data may be represented in any format, such as a ratio of tags generated by the humans and the tags generated by the ML algorithms 113 using the ML models 116. In another embodiment, the underlying data includes the number of tags applied by the human tagger divided by the total number of tags for the corresponding row. Some entries in the confusion matrix 201 are shaded to reflect similarities and differences between the human-generated labels on the y-axis and the labels generated programmatically by the ML algorithms 113 using the ML models 116.

The ML application 112 then analyzes each row of the confusion matrix 201. Generally, for each row of the confusion matrix 201, the ML application 112 identifies the entry containing the maximum values (e.g., the greatest ratio) outside of the diagonal of the confusion matrix 201. In at least one embodiment, the ML application 112 further determines whether the maximum values are greater than a predefined threshold. If the ML application 112 determines that more than one entry outside of the diagonal of the confusion matrix 201 contains the maximum value, the ML application 112 determines that a labeling error exists for the classes corresponding to the columns where the maximum values are located. For example, as shown, the matrix elements 210, 211 corresponding to person D are shaded to indicate that two entries have the same maximum value (and the maximum values exceed the threshold), and that an error exists for the class of person A in the input data 115 (e.g., the labels applied to the frames of the first movie) and/or the applicable ML model 116. Similarly, if the ML application 112 determines that the position of the maximum value of the row is not in a diagonal position of the confusion matrix 201, the ML application 112 determines that an error exists for the class corresponding to the column where the maximum value is located. For example, as shown, the maximum value for person C is element 212 of the confusion matrix 201, but element 212 is not in a diagonal position of the confusion matrix 201. Therefore, the ML application 112 determines that an error exists for the class of person B in the input data 115 and/or the ML model 116. However, because the maximum value for person E in element 213 is on the diagonal of the confusion matrix 201, the ML application 112 determines that an error does not exist for the class of person E in the training data and/or the ML model 116.

However, the labeling errors may be of different types, and the ML application 112 needs to determine which type a given labeling error corresponds to. As previously stated, a first labeling error type may be that the ML algorithms 113 using the ML models 116 apply the same label to different persons (e.g., tagging persons A and E with a tag of person A), while a second labeling error type may be that the ML algorithms 113 using the ML models 116 only applies a single tag to a given person (e.g., only tags person B as person D). Furthermore, both types of labeling error types may occur at the same time. To determine the type of a detected error based on the confusion matrix 201, the ML application 112 generates a column-normalized confusion matrix.

Figure 2B:
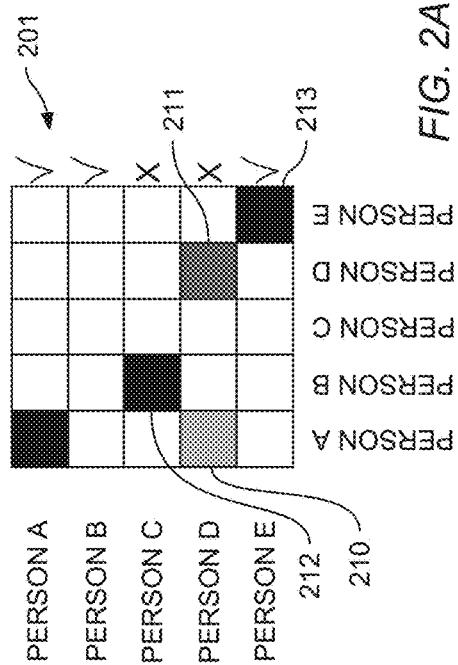

FIG. 2B depicts an example column-normalized confusion matrix 202 used by the ML application 112 to determine the type of labeling error. The column-normalized confusion matrix 202 depicts the results of human-based tagging in the y-axis, and the results of the results of the tagging generated by the ML algorithms 113 using the ML models 116 in the x-axis. The underlying values of the column-normalized confusion matrix 202 are based on the number of tags applied by the ML algorithms 113 divided by the total number of tags for the column.

Generally, for a given row of the confusion matrix 201 reflecting a labeling error, the ML application 112 identifies values from the confusion matrix 202 corresponding to the locations of the maximum values outside the diagonal for the row from the confusion matrix 201. The identified values in the confusion matrix 202 indicate that a labelling error exists for the labels associated with the corresponding column of the confusion matrix 202. The ML application 112 then compares the identified maximum values with the value of the element in the diagonal corresponding to the column having the labeling error in the confusion matrix 202. The ML application 112 may perform the comparison in any number of ways. For example, the ML application 112 may compute a difference between the identified maximum value in the confusion matrix 202 and the value of the element in the diagonal of the confusion matrix 202. If an absolute value of the difference is less than a threshold, the ML application 112 determines that the labeling error is of the first type, such that the ML algorithms 113 and/or the ML models 116 are applying the same tag to different people. As another example, the ML application 112 may compare the values based on a ratio of the identified values.

For example, as depicted in FIG. 2B, the ML application 112 computes the difference between the maximum values in elements 214, 215 of the confusion matrix to determine the type of labeling error experienced in classifying person A. The ML application 112 uses elements 214, 215 of the confusion matrix 202, as these correspond to the positions of the maximum values outside of the diagonal for the row of the confusion matrix 201 (accounting for the fact that confusion matrix 201 is row-normalized, while confusion matrix 202 is column normalized). For example, if the value in element 215 indicates that 70% of the tags applied by the ML model 116 were for person A, while the value in element 214 indicates that 30% of the tags applied by the ML model 116 were for person D, the absolute value of the difference would be 40%. Assuming an example threshold of 60%, the ML application 112 determines that the absolute value of the difference is less than the threshold and determines that the classification problem is of the first type.

Figure 2C:
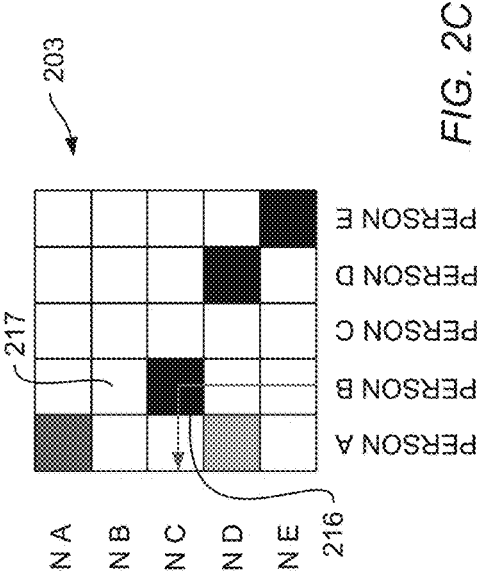

However, if the absolute value of the difference of the values is greater than the threshold, the ML application 112 determines that the error is of the second type, and may correct the incorrect label. FIG. 2C depicts an example where the ML application 112 identifies and corrects an incorrect label for person B in the input data 115. As shown, the ML application 112 compares the value in element 216 of the confusion matrix 203 with the value in element 217 in confusion matrix 203. Assuming the values in elements 216, 217 of the confusion matrix 203 reflect that 100% of the labels entered by the ML models 116 were for person B, but 0% of the ML models 116 tagged the same frames of video with the correct label of person C entered by humans, the absolute value of the difference of these values would be 100%, greater than the example threshold of 60%. In at least one embodiment, the ML application 112 relabels the class in the input data 115 from person B to person C.

To correct the first type of labeling error, the ML application 112 reorganizes the initial input data 115 to refine the labels. For example, to correct the confusion the ML algorithms 113 and/or ML models 116 have for persons A and D, the ML application 112 may provide a plurality of sample images and/or video frames (e.g., from the first movie) known to depict persons A and D to the ML algorithms 113. The samples may include the labels provided by human reviewers. The ML algorithms 113 may then be retrained (based on the correction of both types of labeling errors) to generate updated ML models 116 that are more accurate when identifying people in image data.

Furthermore, the ML application 112 may go through multiple iterations of the above-described process to further refine a given set of input data 115. With each iteration, the ML application 112 further transforms a given set of input data 115 to include the known samples identified by the human reviewers, along with any additions, deletions, and/or revisions to the labels used to cluster the set of input data 115.

Figure 3:
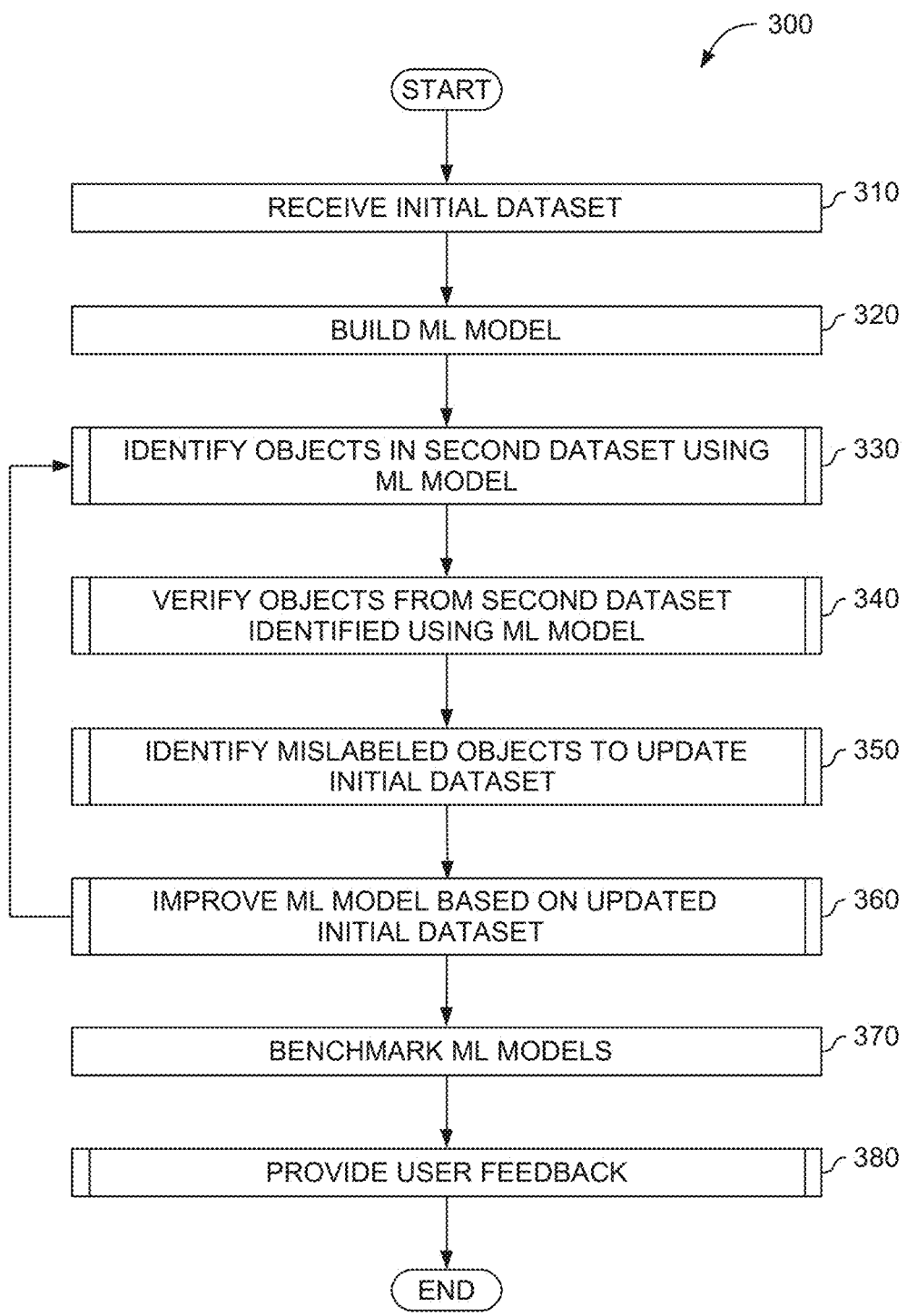
FIG. 3 is a flow chart illustrating a method to provide semiautomatic machine learning model improvement and benchmarking, according to one embodiment.

FIG. 3 is a flow chart illustrating a method 300 to provide semiautomatic machine learning model improvement and benchmarking, according to one embodiment. As shown, the method 300 begins at block 310, where the ML application 112 receives an initial dataset from the input data 115. As previously indicated, the initial dataset from the input data 115 may include labeling (or classification) errors. At block 320, the ML application 112 and/or the ML algorithms 113 generate a ML model 116 based on the initial dataset from the input data 115. At block 330, described in greater detail with reference to FIG. 4, the ML algorithms 113 use the generated ML model 116 to identify objects in a second dataset from the input data 115. Generally, at block 330, the ML algorithms 113 classify each image and/or frame of video from the second set of input data 115 as belonging to one or more groups based on one or more criteria. For example, the images and/or video frames in the second set of input data 115 may be tagged with a label corresponding to each person detected therein. At block 340, described in greater detail with reference to FIG. 5, one or more users verify the labels generated by the ML algorithms 113 and the ML models 116 at block 330. Generally, during the review process, the users review the labels generated by the ML algorithms and/or the ML models for correctness, and make any revisions and/or additions as necessary.

At block 350, described in greater detail with reference to FIG. 5, the ML application 112 identifies labeling errors in the labels generated for the second dataset at block 320 by the ML algorithms 113 and/or the ML models 116. Doing so allows the ML application 112 to update the initial dataset (e.g. with corrected labels, new labels, etc.). Generally, the ML application 112 leverages the confusion matrices (e.g., the confusion matrices 201, 202) to determine mislabeled objects as described above. At block 360, the ML application 112 improves the ML model(s) 116 generated at block 320 based on the updates made to the initial dataset at block 350. At this point, in one or more embodiments, the method 300 may return to block 330 where another data set of input data 115 is processed to further refine the initial dataset. Generally, any number of iterations of blocks 330-360 may be performed for any number of datasets of input data 115 to improve the initial dataset of input data 115 and/or the ML models 116.

At block 370, the ML application 112 may optionally benchmark the ML models 116. Generally, the ML application 112 may determine whether the object detection performance of the ML algorithms 113 and/or ML models 116 improved from iteration to iteration of blocks 330-360, and if so, by what amount (e.g., how much did the percentage of correctly identified objects improve). The improvement may be allocated based on combinations of different ML algorithms 113 and/or ML models 116. Furthermore, in the benchmarking, the ML application 112 may determine whether the ML algorithms 113 and/or ML models 116 correctly identify new samples after the ML model 116 has been updated based on similar samples that were previously incorrectly classified. At block 380, described in greater detail with reference to FIG. 9, the ML application 112 may provide user feedback to the users who reviewed the tags generated by the ML algorithms 113 and/or ML models 116 at block 340. Generally, at block 380, the ML application 112 computes one or more scores reflecting the performance of each user, and outputs the scores and/or one or more messages associated with the scores to the user.

Figure 4:
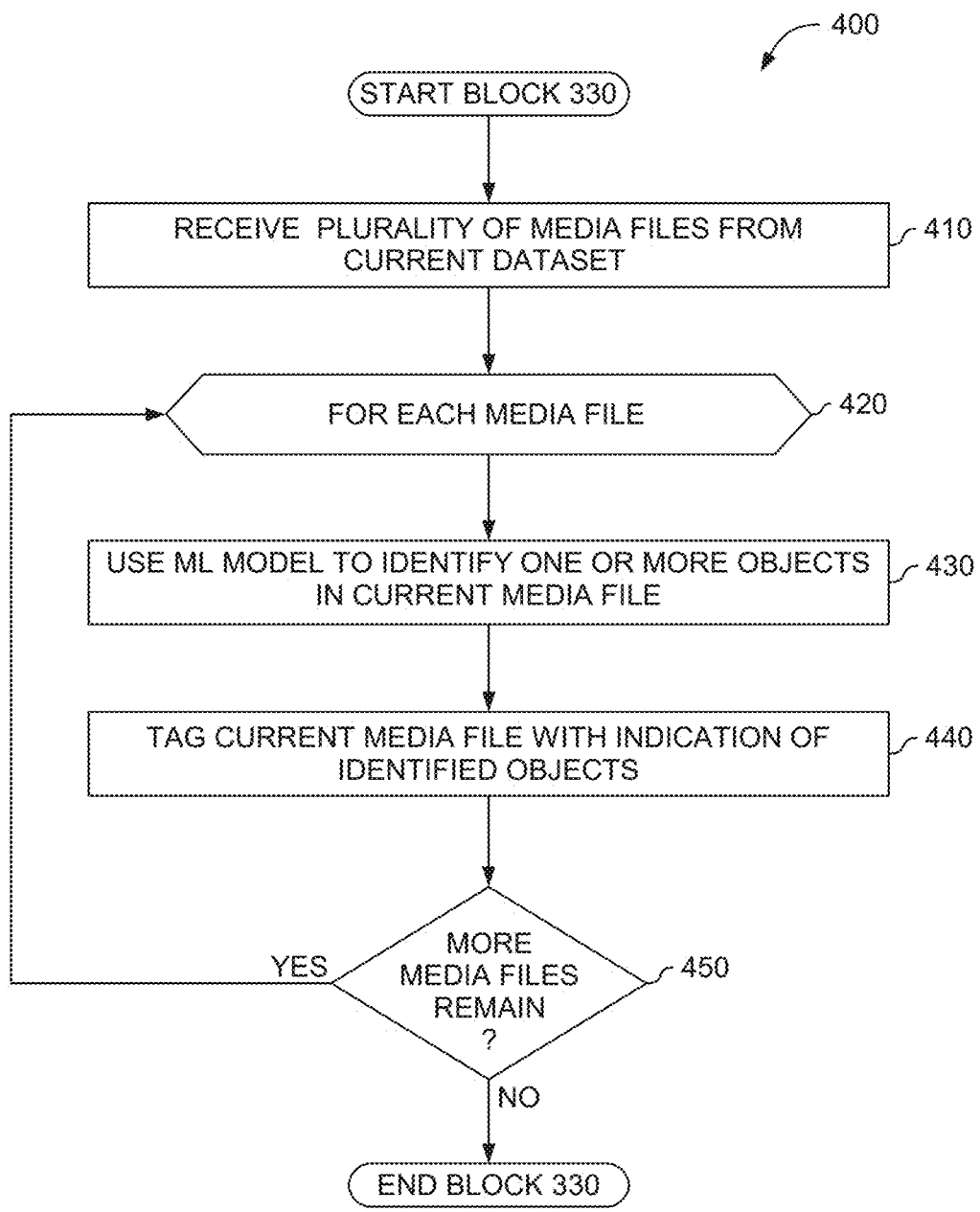
FIG. 4 is a flow chart illustrating a method to identify objects using a machine learning model, according to one embodiment.

FIG. 4 is a flow chart illustrating a method 400 corresponding to block 330 to identify objects using a machine learning model, according to one embodiment. As shown, the method 400 begins at block 410, where the ML algorithms 113 and/or ML models 116 receive a plurality of media files for a dataset from the input data 115 (e.g., a set of images and/or videos). At block 420, the ML algorithms 113 execute a loop including blocks 430-450 for each media file received at block 410. At block 430, the ML algorithms 113 apply the current ML models 116 to identify one or more objects in the current media file. The objects may be any type of object, such as people, animals, food items, locations, buildings, and the like. At block 440, the ML algorithms 113 and/or ML models 116 tag the current media file with an indication of the objects identified at block 430. For example, the indication may be that the current frame of video depicts person Y. Doing so may associate the current frame of video with other frames of videos that have also been labeled with the tag of person Y. At block 450, the ML algorithms 113 determine whether more media files in the dataset of input data 115 remain. If more media files remain, the method returns to block 420. Otherwise, the method 400 ends.

Figure 5:
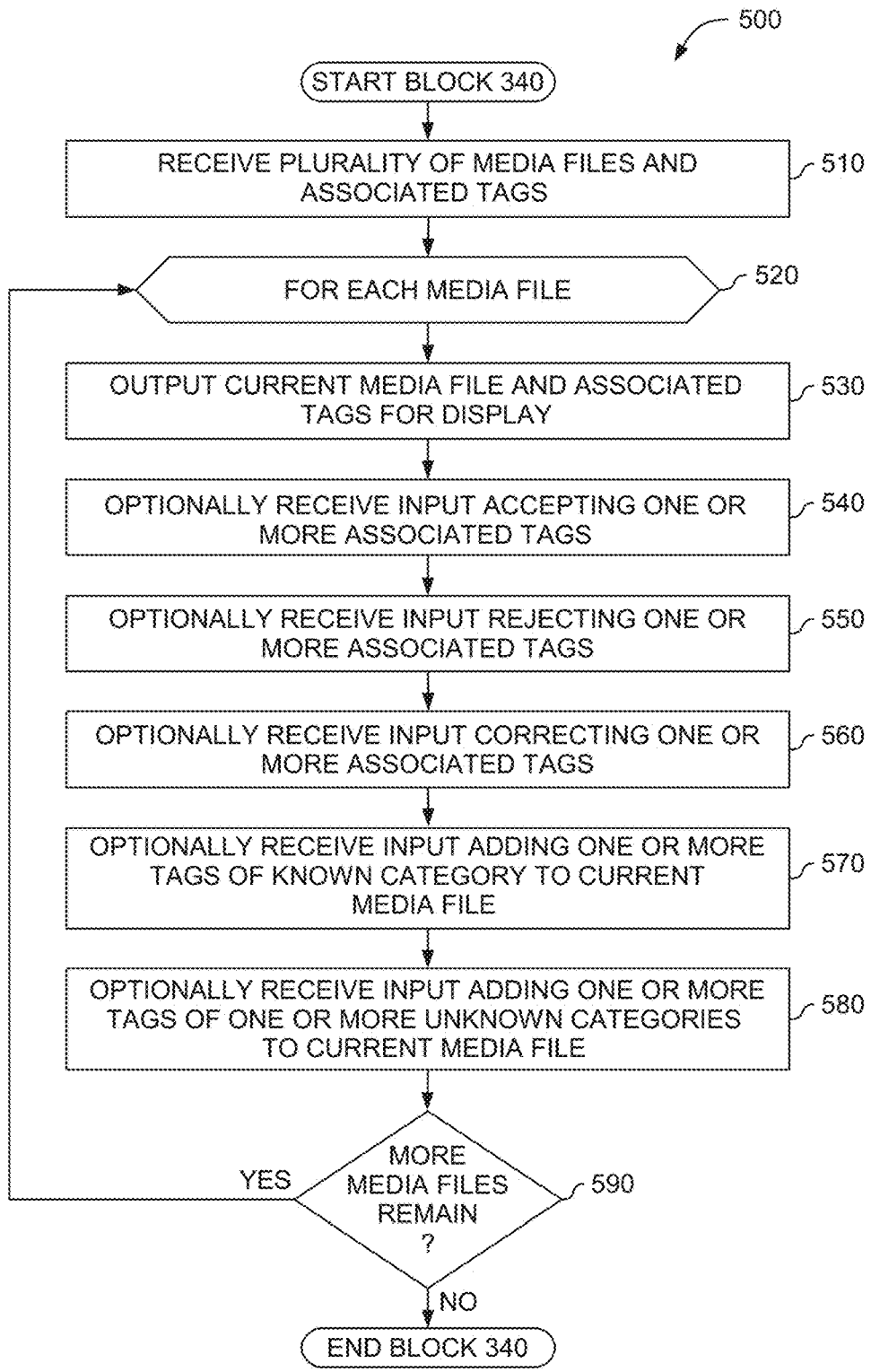
FIG. 5 is a flow chart illustrating a method to verify objects identified by a machine learning model, according to one embodiment.

FIG. 5 is a flow chart illustrating a method 500 corresponding to block 340 to verify objects identified by the ML algorithms 113 and/or ML models 116, according to one embodiment. As shown, the method 500 begins at block 510, where the media files of the second (or subsequent) dataset from the input data 115 and the associated tags generated by the ML algorithms 113 and/or ML models 116 are received by the ML application 112. At block 520, the ML application 112 executes a loop including blocks 530-590 for each media file in the received dataset. At block 530, the ML application 112 outputs the current media file (e.g., an image or frame of video) and any tags applied to the current media file by the ML algorithms 113 and/or ML models 116.

At block 540, the ML application optionally receives user input accepting one or more of the outputted tags, indicating the one or more accepted tags generated by the ML algorithms 113 and/or ML models 116 are correct. At block 550, the ML application 112 optionally receives user input rejecting one or more of the outputted tags, indicating the one or more rejected tags generated by the ML algorithms 113 and/or ML models 116 were incorrect.

At block 560, the ML application 112 optionally receives input correcting one or more tags outputted for display. For example, the current image may be tagged with a label indicating person A is depicted in the image. However, the reviewing user may determine that person B, and not person A, is depicted in the image. The user may then manually correct the label to indicate that person B is depicted in the image. At block 570, the ML application 112 may optionally receive user input adding one or more tags from a known category to the current media file. For example, if persons C and E are depicted in the current media file, but the ML algorithms 113 and/or ML models 116 only tagged the current media file with an indication that person C is depicted, the user may also tag the current media file indicating that person E is depicted.

At block 580, the ML application may optionally receive user input adding one or more tags of one or more unknown categories to the current media file. For example, assuming persons A-E were the only known categories of persons, a user may determine that person F is also depicted in the current media file. As such, the user may create a label for person F, and add a tag for person F to the current media file. At block 590, the ML application 112 determines whether more media files remain in the current dataset of input data 115. If more media files remain, the method returns to block 520. Otherwise, the ML application 112 stores any received user input and the method 500 ends.

Figure 6:
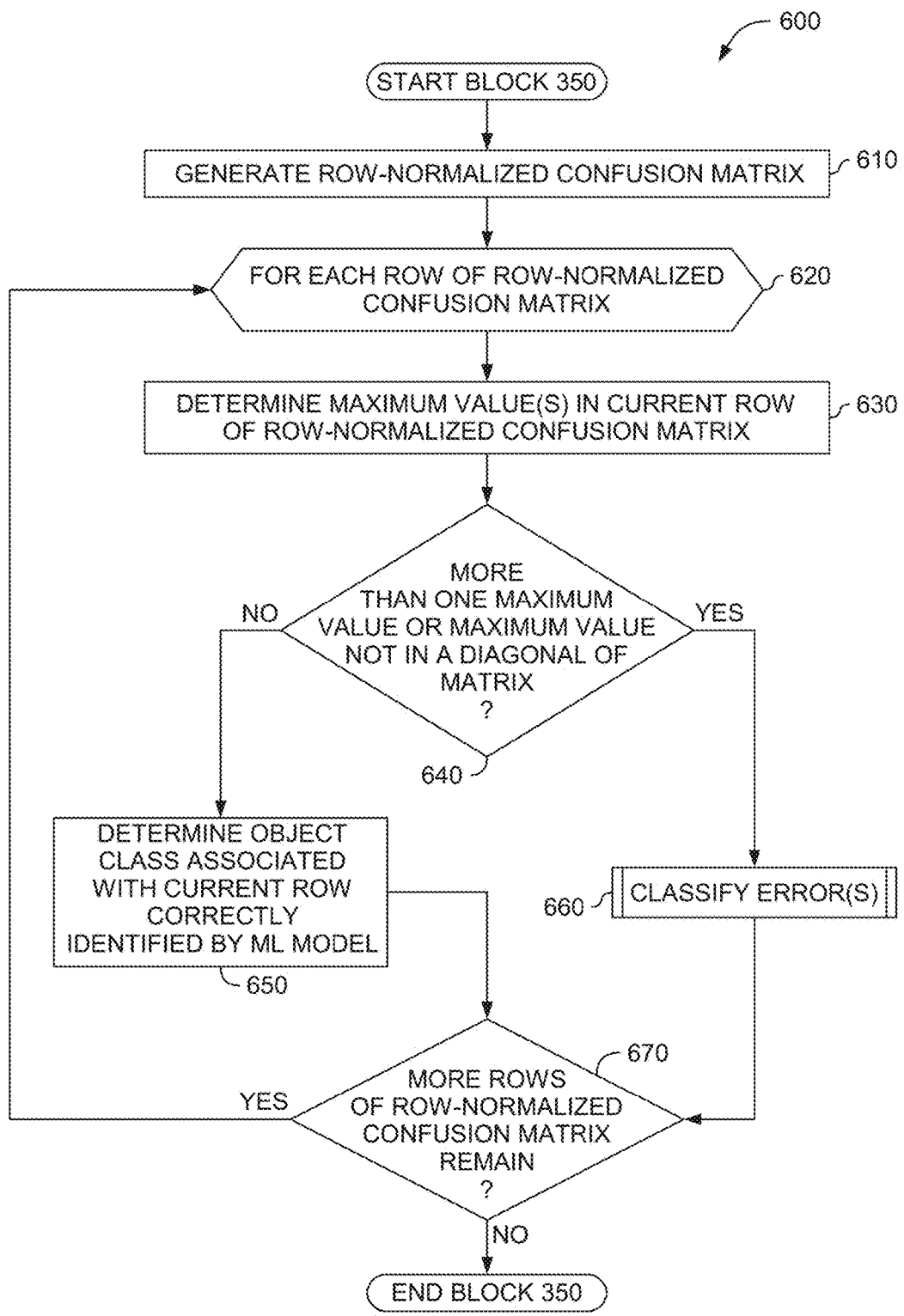
FIG. 6 is a flow chart illustrating a method to identify mislabeled objects to update a dataset, according to one embodiment.

FIG. 6 is a flow chart illustrating a method 600 corresponding to block 350 to identify mislabeled objects to update the initial dataset of input data 115, according to one embodiment. As shown, the method 600 begins at block 610, where the ML application 112 generates a row-normalized confusion matrix (e.g., the confusion matrix 201) based on the tags generated by the ML algorithms 113 and/or ML models 116 and the user-provided tags (e.g., from the method 500). At block 620, the ML application 112 executes a loop including blocks 630-670 for each row of the row-normalized confusion matrix 201. At block 630, the ML application 112 identifies the maximum values in the current row of the row-normalized confusion matrix 201. In at least one embodiment, before proceeding to block 640, the ML application 112 determines whether the identified maximum values exceed a threshold. At block 640, the ML application 112 determines whether more than one maximum value exists or whether a single maximum value is not located in a diagonal position of the confusion matrix 201. If a single maximum value is identified, and the single maximum value is in a diagonal position of the confusion matrix 201, the method proceeds to block 650, where the ML application 112 determines that the object class associated with the current row was correctly identified with consistency by the ML algorithms 113 and/or ML models 116, which need not be updated to improve detection of the current object class. Similarly, the ML application 112 determines that the initial dataset of input data 115 need not be updated to rebuild the ML models 116.

Returning to block 640, if more than one maximum value is identified in the current row, or a single maximum value is identified that is not in a diagonal position of the confusion matrix 201, the ML application 112 proceeds to block 660. At block 660, described in greater detail with reference to FIG. 7, the ML application 112 classifies one or more labeling errors. Generally, the ML application 112 classifies the labeling errors by using a column-normalized confusion matrix to detect divergences in labels (or tags). As previously stated, the ML application 112 may determine that the ML algorithms 113 and/or ML models 116 are tagging different objects with the same label (e.g., the first type of labeling error), and/or that the ML algorithms 113 and/or ML models 116 is confusing labels (e.g., the second type of labeling error). At block 670 the ML application 112 determines whether more rows of the row-normalized confusion matrix remain. If so, the ML application 112 returns to block 620. Otherwise, the method 600 ends.

Figure 7:
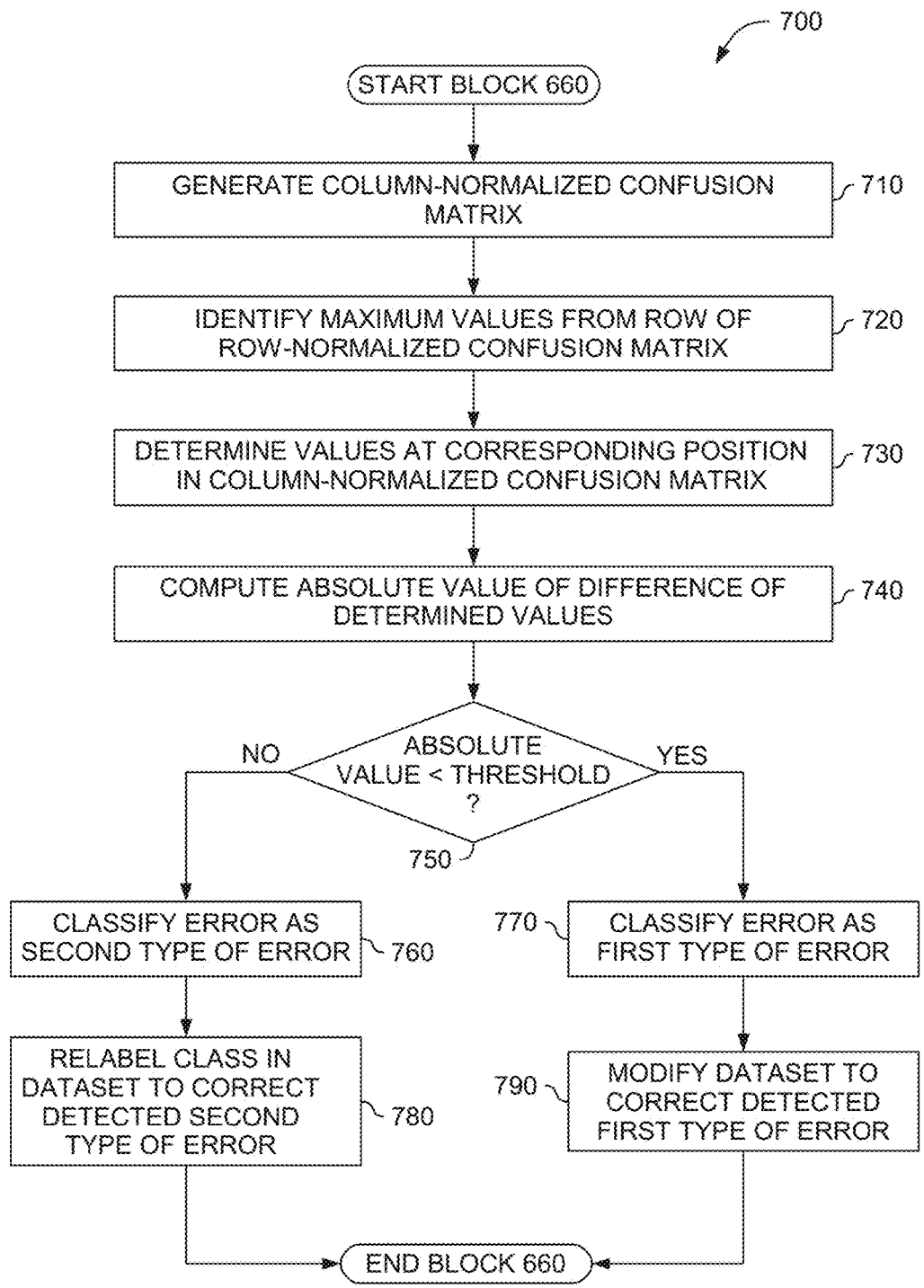
FIG. 7 is a flow chart illustrating a method to classify machine learning errors, according to one embodiment.

FIG. 7 is a flow chart illustrating a method 700 corresponding to block 660 to classify machine learning labeling errors, according to one embodiment. As shown, the method 700 begins at block 710, where the ML application 112 generates a column-normalized confusion matrix based on the labels generated by the ML algorithms 113 and/or ML models 116 and the user-provided labels (e.g., via the method 500). At block 720, the ML application 112 identifies the maximum values from the corresponding row of the row-normalized confusion matrix. At block 730, the ML application 112 determines the values at the corresponding position in the column-normalized confusion matrix. At block 740, the ML application 112 computes an absolute value of the difference between the identified values. At block 750, the ML application 112 determines whether the absolute value is less than a corresponding threshold. If the absolute value is greater than the threshold, the ML application 112 proceeds to block 760, where the ML application 112 classifies the labeling error as the second type of labeling error. At block 780, the ML application 112 relabels the incorrect class in the initial dataset of the input data 115. For example, if the ML algorithms 113 and/or ML models 116 consistently tags person E with the label of person D, the ML application 112 may relabel the class of person E with that of person D in the initial dataset of the input data 115. Returning to block 750, if the absolute value is less than the threshold, the ML application 112 proceeds to block 770, where the ML application 112 classifies the current labeling error as being of the first type. At block 790, the ML application 112 modifies the initial dataset to correct the first type of labeling error, as the ML algorithms 113 and/or ML models 116 are confusing classes. For example, the ML application 112 may add sample images from the second (or subsequent) datasets that were misclassified to the initial dataset. These samples may then be used to retrain the ML models 116.

Figure 8:
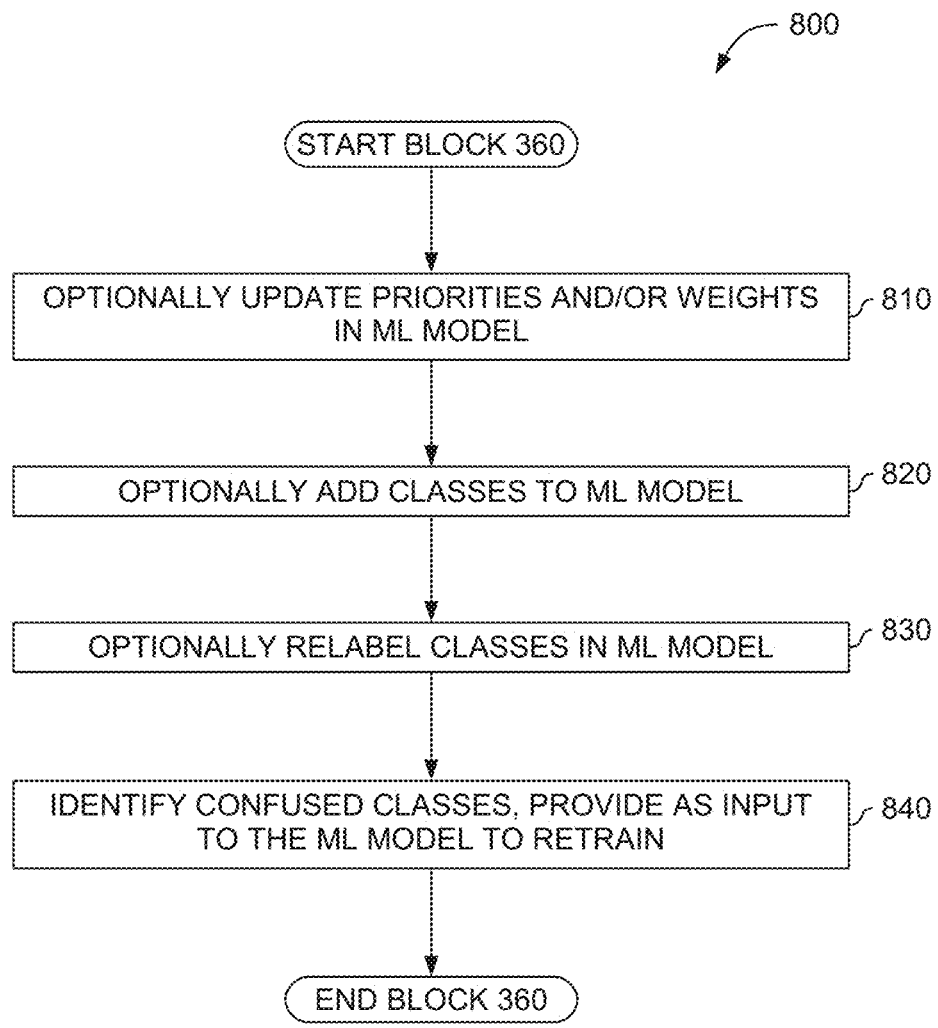
FIG. 8 is a flow chart illustrating a method to improve machine learning models based on an updated training dataset, according to one embodiment.

FIG. 8 is a flow chart illustrating a method 800 corresponding to block 360 to improve machine learning models based on an updated training dataset, according to one embodiment. As shown, the method 800 begins at block 810, where the ML application 112 optionally updates the weights and/or priorities in the corresponding ML model 116. For example, if a user X is determined to accurately tag objects in images consistently, the ML application 112 may update the ML model 116 to give extra weight to the tags reviewed and/or generated by user X during the method 500. Similarly, the ML application 112 may update the ML model 116 to give less weight to the tags reviewed and/or generated by user Y if the ML application 112 determines that user Y does not accurately tag objects in images consistently. At block 820, the ML application 112 may optionally add classes to the ML model 116. For example, if a new class of objects is identified, the ML application 112 may update the ML model 116 (and/or the relevant input data 115) to reflect the new class of objects. At block 830, the ML application 112 may optionally relabel classes in the ML model 116 and/or the input data 115. At block 840, the ML application 112 provides confused classes as input to the ML algorithms 113 and/or ML model 116 to retrain the ML model 116.

Figure 9:
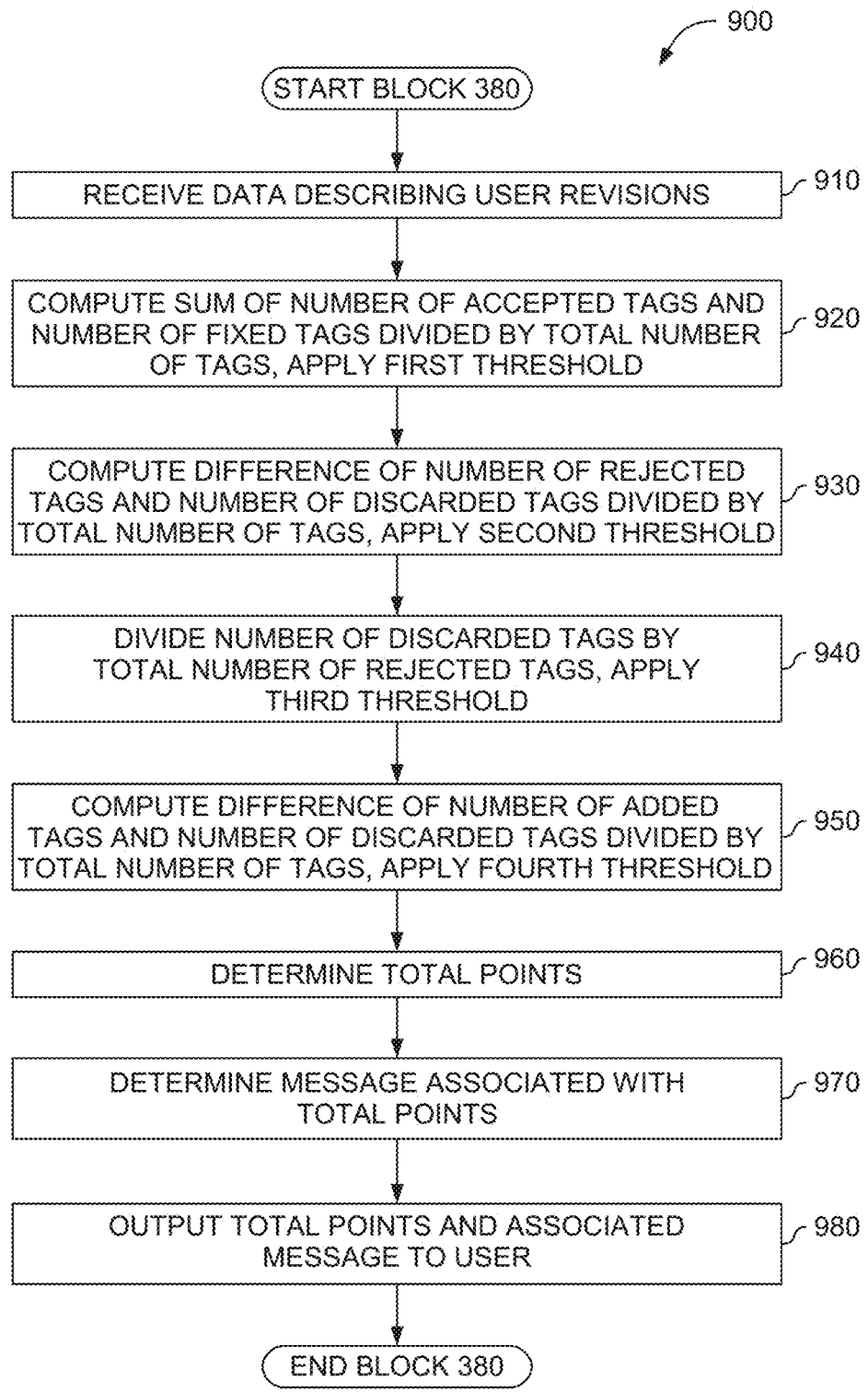
FIG. 9 is a flow chart illustrating a method to provide user feedback, according to one embodiment.

FIG. 9 is a flow chart illustrating a method 900 to provide user feedback, according to one embodiment. As shown, the method 900 begins at block 910, where the ML application 112 receives data describing tags generated by the ML algorithms 113 and/or ML models 116 that were processed by a given user (e.g., the feedback received via the method 500). At block 920, the ML application 112 determines computes a sum of the total number of tags accepted by the user and the number of tags fixed by the user. The ML application 112 then divides the computed sum by the total number of tags reviewed by the user. In at least one embodiment, the ML application 112 applies a corresponding threshold to the computed difference, where the threshold indicates an acceptable level of performance for the user with respect to this metric. At block 930, the ML application 112 computes the difference between the total number of tags rejected by the user and the total number of tags discarded by the user. The ML application 112 then divides the difference by the total number of tags reviewed by the user. The ML application 112 may then compare the computed difference to a second threshold to determine whether the user is performing acceptably with regard to this metric.

At block 940, the ML application 112 divides the number of tags discarded by the user by the total number of tags rejected by the user. The ML application 112 may then compare the computed value to a third threshold to determine whether the user is performing acceptably with respect to this metric. At block 950, the ML application 112 computes a difference between the number of tags added by the user and the number of tags discarded by the user. The ML application 112 then divides the computed difference by the total number of tags reviewed by the user. The ML application 112 may then apply a fourth threshold to the computed value to determine whether the user is performing acceptably with respect to this metric.

At block 960, the ML application 112 determines a total score for the user by adding the values computed at blocks 920 and 940. At block 970, the ML application 112 determines a message associated with the total score computed at block 960 (or any of the scores computed at blocks 920-950). Generally, a given score may have a range of values. Each range of score values may be associated with one or more predefined messages which can assist the user in improving their performance. At block 980, the ML application 112 outputs the total points and any identified messages to the user via a user interface, e.g., at the end of a current user session. As another example, the ML application 112 outputs the total points and identified messages at the beginning of a new user session, e.g., If the user is following the same patterns previously identified as being erroneous.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the ML application 112 could execute on a computing system in the cloud. In such a case, the ML application 112 could improve initial training datasets in the input data 115, and store the improved training datasets at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
processing, by a machine learning (ML) algorithm and a ML model, a plurality of images in a first dataset, wherein the ML model was generated based on a plurality of images in a training dataset;
receiving user input reviewing a respective set of tags applied to each image in the first data set as a result of the processing;
identifying, based on a first confusion matrix generated based on the user input and the sets of tags applied to the images in the first data set, a first labeling error in the training dataset;
determining a type of the first labeling error based on a second confusion matrix; and
modifying the training dataset based on the determined type of the first labeling error.

2. The method of claim 1, wherein the first confusion matrix comprises a row-normalized confusion matrix, and wherein identifying the first labeling error in the training dataset comprises at least one of:
identifying at least two instances of a maximum value in a first row of the first confusion matrix, wherein the first row of the first confusion matrix corresponds to a first tag of at least one of the sets of tags; or
upon determining that one instance of a maximum value occurs in a first row of the first confusion matrix, determining that a position of the one instance of the maximum value is not on a diagonal of the first confusion matrix.

3. The method of claim 1, wherein the second confusion matrix comprises a column-normalized matrix, and wherein determining the type of the first labeling error comprises:
computing an absolute value of a difference of two values in a first column of the second confusion matrix,
wherein when the computed absolute value does not exceed a threshold, the type of the first labeling error is a first type, and
wherein when the computed absolute value exceeds the threshold, the type of the first labeling error is a second type, different than the first type.

4. The method of claim 3, wherein when the type of the first labeling error is determined to be the first type, modifying the training dataset comprises:
identifying a plurality of images determined to be mislabeled with a first tag of at least one of the sets of tags by the ML algorithm and the ML model; and
adding the identified plurality of images determined to be mislabeled with the first tag to the training dataset.

5. The method of claim 3, wherein when the type of the first labeling error is determined to be the second type, modifying the training dataset comprises:
determining a second tag associated with the first column of the second confusion matrix; and
relabeling the first tag as the second tag in the training dataset.

6. The method of claim 3, further comprising:
rebuilding the ML model based on the modified training dataset;
computing a score for a user providing the user input;
determining a message associated with the computed score; and
outputting an indication of the associated message to the user.

7. The method of claim 1, wherein processing the plurality of images in the first dataset by the ML algorithm and the ML model comprises determining whether at least one object is depicted in a respective image, and wherein at least one image of the plurality of images in the first dataset and the training dataset comprise frames of video.

8. A computer program product, comprising:
a non-transitory computer-readable storage medium having computer-readable program code embodied therewith, the computer-readable program code executable by a processor to perform an operation comprising:
processing, by a machine learning (ML) algorithm and a ML model, a plurality of images in a first dataset, wherein the ML model was generated based on a plurality of images in a training dataset;

receiving user input reviewing a respective set of tags applied to each image in the first data set as a result of the processing;

identifying, based on a first confusion matrix generated based on the user input and the sets of tags applied to the images in the first data set, a first labeling error in the training dataset;

determining a type of the first labeling error based on a second confusion matrix; and modifying the training dataset based on the determined type of the first labeling error.

9. The computer program product of claim 8, wherein the first confusion matrix comprises a row-normalized confusion matrix, and wherein identifying the first labeling error in the training dataset comprises at least one of:

identifying at least two instances of a maximum value in a first row of the first confusion matrix, wherein the first row of the first confusion matrix corresponds to a first tag of at least one of the sets of tags;

upon determining that one instance of a maximum value occurs in a first row of the first confusion matrix, determining that a position of the one instance of the maximum value is not on a diagonal of the first confusion matrix.

10. The computer program product of claim 8, wherein the second confusion matrix comprises a column-normalized matrix, and wherein determining the type of the first labeling error comprises:

computing an absolute value of a difference of two values in a first column of the second confusion matrix, wherein when the computed absolute value does not exceed a threshold, the type of the first labeling error is a first type, and wherein when the computed absolute value exceeds the threshold, the type of the first labeling error is a second type, different than the first type.

11. The computer program product of claim 10, wherein when the type of the first labeling error is determined to be the first type, modifying the training dataset comprises:

identifying a plurality of images determined to be mislabeled with a first tag of at least one of the sets of tags by the ML algorithm and the ML model; and adding the identified plurality of images determined to be mislabeled with the first tag to the training dataset.

12. The computer program product of claim 10, wherein when the type of the first labeling error is determined to be the second type, modifying the training dataset comprises:

determining a second tag associated with the first column of the second confusion matrix; and relabeling the first tag as the second tag in the training dataset.

13. The computer program product of claim 10, the operation further comprising: rebuilding the ML model based on the modified training dataset;

computing a score for a user providing the user input;

determining a message associated with the computed score; and outputting an indication of the associated message to the user.

14. The computer program product of claim 8, wherein processing the plurality of images in the first dataset by the ML algorithm and the ML model comprises determining whether at least one object is depicted in a respective image, and wherein at least one image of the plurality of images in the first dataset and the training dataset comprise frames of video.

15. A system, comprising:
one or more computer processors; and
a memory containing a program which when executed by the processors performs an operation comprising:

processing, by a machine learning (ML) algorithm and a ML model, a plurality of images in a first dataset, wherein the ML model was generated based on a plurality of images in a training dataset;

receiving user input reviewing a respective set of tags applied to each image in the first data set as a result of the processing;

identifying, based on a first confusion matrix generated based on the user input and the sets of tags applied to the images in the first data set, a first labeling error in the training dataset;

determining a type of the first labeling error based on a second confusion matrix; and modifying the training dataset based on the determined type of the first labeling error.

16. The system of claim 15, wherein the first confusion matrix comprises a row-normalized confusion matrix, and wherein identifying the first labeling error in the training dataset comprises at least one of:

identifying at least two instances of a maximum value in a first row of the first confusion matrix, wherein the first row of the first confusion matrix corresponds to a first tag of at least one of the sets of tags;

upon determining that one instance of a maximum value occurs in a first row of the first confusion matrix, determining that a position of the one instance of the maximum value is not on a diagonal of the first confusion matrix.

17. The system of claim 15, wherein the second confusion matrix comprises a column-normalized matrix, and wherein determining the type of the first labeling error comprises:

computing an absolute value of a difference of two values in a first column of the second confusion matrix, wherein when the computed absolute value does not exceed a threshold, the type of the first labeling error is a first type, and wherein when the computed absolute value exceeds the threshold, the type of the first labeling error is a second type, different than the first type.

18. The system of claim 17, wherein when the type of the first labeling error is determined to be the first type, modifying the training dataset comprises:

identifying a plurality of images determined to be mislabeled with a first tag of at least one of the sets of tags by the ML algorithm and the ML model; and adding the identified plurality of images determined to be mislabeled with the first tag to the training dataset.

19. The system of claim 17, wherein when the type of the first labeling error is determined to be the second type, modifying the training dataset comprises:

determining a second tag associated with the first column of the second confusion matrix; and relabeling the first tag as the second tag in the training dataset.

20. The system of claim 17, wherein processing the plurality of images in the first dataset by the ML algorithm and the ML model comprises determining whether at least one object is depicted in a respective image, and wherein at least one image of the plurality of images in the first dataset and the training dataset comprise frames of video, the operation further comprising:

rebuilding the ML model based on the modified training dataset;
computing a score for a user providing the user input;
determining a message associated with the computed score; and
outputting an indication of the associated message to the user.

\* \* \* \* \*

UNITED STATES PATENT AND TRADEMARK OFFICE
CERTIFICATE OF CORRECTION

PATENT NO. : 10,489,722 B2
APPLICATION NO. : 15/661084
DATED : November 26, 2019
INVENTOR(S) : Miquel Angel Farre Guiu et al.

Page 1 of 1

It is certified that error appears in the above-identified patent and that said Letters Patent is hereby corrected as shown below:

In the Claims

In Column 15, Line 20, in Claim 9, delete "tags;" and insert -- tags; or --, therefor.

In Column 16, Line 28, in Claim 16, delete "tags;" and insert -- tags; or --, therefor.

Signed and Sealed this
Twenty-fifth Day of February, 2020

Andrei Iancu
*Director of the United States Patent and Trademark Office*